J. W. CARTER.
PROTECTIVE DEVICE FOR COOKING UTENSILS.
APPLICATION FILED OCT. 27, 1909.
1,004,146.
Patented Sept. 26, 1911.
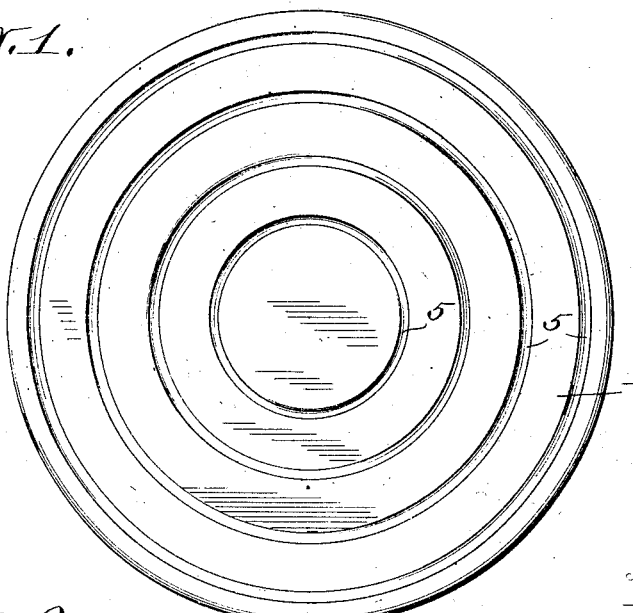
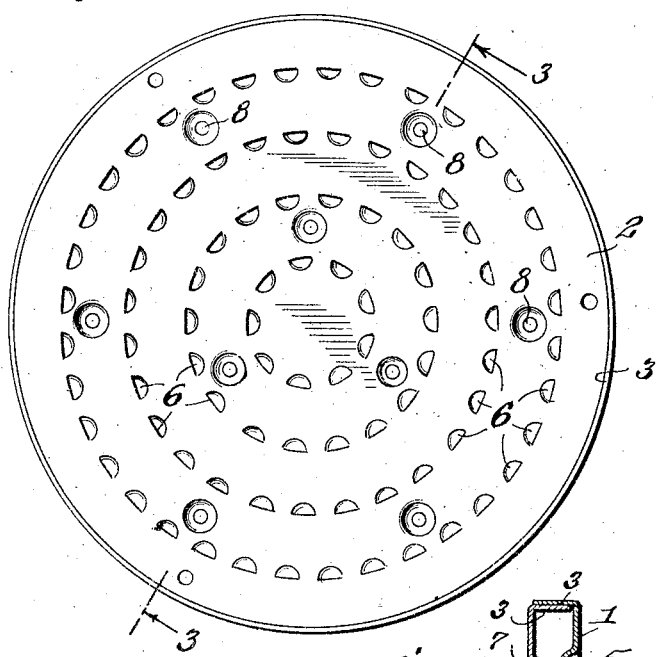
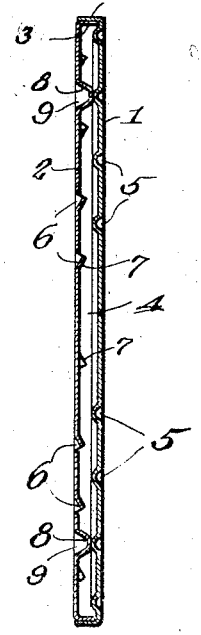
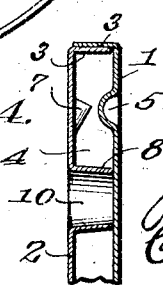
WITNESSES:
INVENTOR
ATTORNEY

UNITED STATES PATENT OFFICE.

JOHN W. CARTER, OF BROOKLYN, NEW YORK.

PROTECTIVE DEVICE FOR COOKING UTENSILS.

1,004,146.  Specification of Letters Patent.  Patented Sept. 26, 1911.

Application filed October 27, 1909.  Serial No. 524,796.

*To all whom it may concern:*

Be it known that I, JOHN W. CARTER, a citizen of the United States, residing in the borough of Brooklyn, county of Kings, and State of New York, have invented a new and useful Improvement in Protective Devices for Cooking Utensils, of which the following is a description.

This invention relates to protective devices for cooking utensils, and particularly to devices adapted to be used on gas and oil stoves, or other stoves when the flame impinges directly upon the device or utensil.

Among the objects of my invention may be noted the following: to provide a simple, cheap and effective device for preventing the contents of any cooking utensil from being burned or scorched or the vessel injured by the flame; to provide a device of the character stated having a chamber wherein the air or gas is confined and becomes intensely heated by the flame, thus increasing its effectiveness and producing quicker results; to provide a device with means which will produce an even distribution of the heated gas within the chamber thereof and cause uniform heating of the top member of the device; and to provide a device of the character stated which is reversible and can be used either side up according to the results desired.

With the above objects in view and others which will be noted during the course of this description, my invention consists in the parts, features, elements and combinations of elements as hereinafter described and claimed.

In order to illustrate my invention I have provided drawings wherein:

Figure 1 is a top plan view of a device embodying my invention; Fig. 2 is a bottom plan view of said device; Fig. 3 is a section on the line 3—3 of Fig. 2; and Fig. 4 is a sectional detail of another form of my invention.

In the drawings, 1 indicates one of the plates and 2 the other of which my device is composed, each plate having a marginal flange 3 which fit snugly one upon the other and enable the plates to be secured together by any suitable means so as to form the chamber 4. The plate 1 is non-foraminous and is provided with concentric grooves 5 which give strength thereto and also serve the purpose when that side is up, of catching anything that boils over in cooking and retaining the same so as to prevent it falling upon the burner or stove. Also boiled-over materials cannot reach the inside of the device and the latter is kept clean and sanitary. Moreover, by making the plate 1 solid, or without openings, the heat is confined within the chamber of the device which latter is caused to become heated sooner. The plate 2 is provided with apertures 6 formed by splitting and deflecting the material of the plate to produce internally extending hoods 7 of any suitable size and height, said hoods having the function of stopping the progress of the flame and causing the heat of the same to be diffused or distributed within the chamber 4. The hoods also impart strength to the plate; and the adjacent apertures 6 freely admit the heat of the flame to the chamber. The plate 2, preferably, is also provided with a plurality of internally extending supporting-teats 8 which may be formed, as shown in Figs. 2 and 3, by deflecting the material of the plate to procure the imperforate openings 9, or as shown in Fig. 4, to provide aperture 10. In either case, the material so deflected will be extended into engagement with the inner surface of the plate 1. These teats are arranged in sufficient number to prevent any weight or excessive heat on either plate from depressing or warping said plate or plates. The hoods 7 and teats 8 are arranged relatively in any desired manner and may be provided in any number. I prefer to arrange the hoods and teats in circular series and all on one plate, as shown in the drawings, since it cheapens the manufacture and simplifies the assembling operations.

From the foregoing construction, it will be seen that an essential feature is the provision of a chamber closed at one side and open at the other wherein the products of combustion can be retained and become intensely heated, when the device is used with its foraminous side to the flame; or which, when the device is used with its closed side to the flame, will permit the heat to be freely and uniformly radiated. In the 1. mode of use, the device will become highly and rapidly heated and its heat retained and the contents of the utensil thereon can be quickly cooked without scorching or burning. In the second mode of use, the contents of the utensil will be subjected to a lesser degree of heat because the top of the chamber will be open and radiation permitted, the said contents cooking more slowly as is desired in many instances. The reversible character of the device and the means for preventing the plates from warping or becoming depressed are important features of my invention.

Another important feature of my invention is the diffusing, or heat deflecting, hood arranged over an aperture for preventing the flame from passing into the chamber 4 and, by arresting said flame, reducing its temperature and eliminating its flame-character. The arrangement of said hoods, as shown in the drawings, is effective and hence important, though not absolutely essential, since by arranging them in concentric circles with the open sides thereof toward the circumference of the device, an equal distribution of the heat in all radial directions is provided for.

Having thus described my invention what I claim and desire to secure by Letters Patent is:

1. A protective device for cooking utensils composed of two plates having coöperating means for securing the same together so as to form a chamber between them; one of said plates being provided with a plurality of apertures; and one of said plates having curved open sided hoods arranged in coöperative relation to said apertures, said hoods having their open sides toward the circumference of the device for diffusing the heat radially.

2. A protective device for cooking utensils composed of two plates having coöperating means for securing the same together so as to form a chamber between them; one of said plates being provided with a plurality of apertures therein; and one of said plates having open sided heat diffusing devices arranged in concentric circles in said chamber, said diffusing devices having their open sides toward the circumference of the protective device, whereby heat passing through the foraminous plate will be equally distributed in the chamber and directed toward the periphery of the device.

In testimony whereof I have hereunto signed my name in the presence of two subscribing witnesses.

JOHN W. CARTER.

Witnesses:
CHAS. McC. CHAPMAN,
MABEL C. HILLOCK.